L. B. PRAHAR.
FRAME JOINT AND METHOD OF SOLDERING THE SAME.
APPLICATION FILED AUG. 11, 1909.
943,370.
Patented Dec. 14, 1909.
Fig. 1.
Fig. 2.
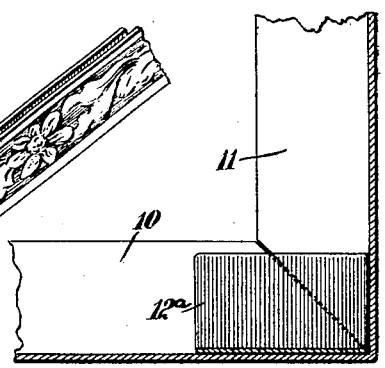
Fig. 7.
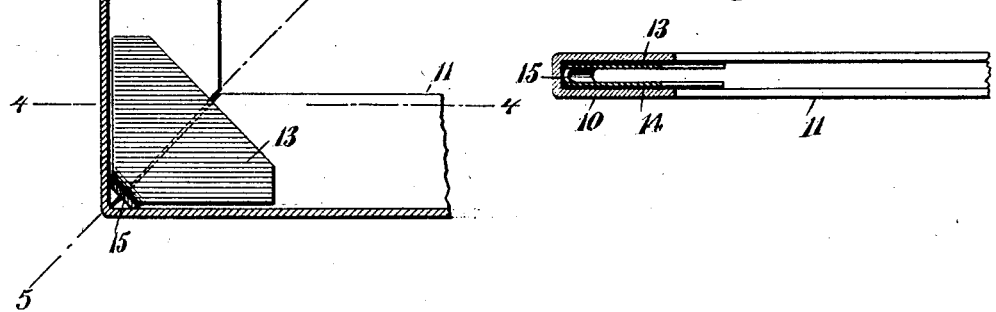
Fig. 3.
Fig. 4.
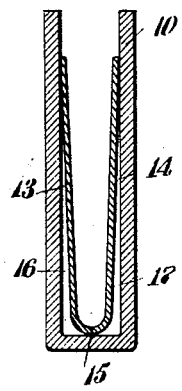
Fig. 5.
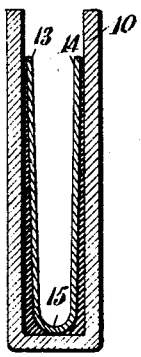
Fig. 6.
WITNESSES
INVENTOR
Louis B. Prahar
BY
ATTORNEYS

UNITED STATES PATENT OFFICE.

LOUIS B. PRAHAR, OF NEW YORK, N. Y.

FRAME-JOINT AND METHOD OF SOLDERING THE SAME.

943,370.  Specification of Letters Patent.  Patented Dec. 14, 1909.

Application filed August 11, 1909. Serial No. 512,341.

*To all whom it may concern:*

Be it known that I, LOUIS B. PRAHAR, a citizen of the United States, and a resident of the city of New York, borough of Brooklyn, in the county of Kings and State of New York, have invented a new and Improved Frame-Joint and Method of Soldering the Same, of which the following is a full, clear, and exact description.

This invention relates to certain improvements in frame joints, and more particularly to a new method of securing together the abutting ends of metal channels going to make up the frame.

Metal channel members are commonly employed in making the joints of frames of hand-bags and in making small picture frames, and at the corners it is common to secure together the abutting ends of the channel members by hard solder. During the soldering the channels become highly heated and often warp to such an extent that a separate operation is necessary to again straighten them. Furthermore, the channels become discolored from the heat and from the flux, so as to necessitate the reburnishing of the parts. The space within the channel is too narrow for the insertion of a soldering iron, so if an iron be employed it must be to the exterior.

In forming a joint in accordance with my invention, I insert a channel-shaped member within the two channels at their abutting ends, said channel member being of such form that it is spaced from the sides of the channels adjacent the web of the latter but resiliently contacts with the sides adjacent their free edges. This inner channel member holds the sides of the channels in proper alinement, and, at the same time, leaves a capillary space for the solder. Soft solder is dropped into the inner channel member and passes out of the latter at the ends or through suitable apertures into the channels, and is then drawn upwardly by capillary attraction between the sides of the channels and the sides of the inner channel member, so as to effectively secure the channel member to both of the channels and to fill the narrow space between the ends of the abutting sides of the channels. No soldering iron need be employed; the channels are not heated, so as to warp or discolor them, and no surplus solder or flux remains upon the outside. The space between the sides of the channels is not obstructed to any appreciable extent to prevent the insertion of any member or device which it is desired to hold by the completed frame.

Reference is to be had to the accompanying drawings, forming a part of this specification, in which similar characters of reference indicate corresponding parts in all the figures, and in which—

Figure 1 is a perspective view of a channel member adapted to be inserted in the making of a joint in accordance with my invention; Fig. 2 is a perspective view of a corner of a frame formed of channels and prior to soldering; Fig. 3 is a section through the corner after the insertion of the channel member and prior to soldering; Figs. 4 and 5 are transverse sections on the lines 4—4 and 5—5, respectively, of Fig. 3; Fig. 6 is a view similar to Fig. 5 but after the soldering is completed, and Fig. 7 is a section similar to Fig. 3, but showing a different form of inner channel member.

My invention may be utilized in the manufacture of joints for bag jaws, picture frames, or articles of any other character which involve the securing together of the abutting ends of channels. The channels secured together may be in alinement with each other or may intersect at right angles or at any other desired angles. In the accompanying drawings, I have illustrated a joint and the parts going to make up the same, as used for the corner of an ornamental metal frame. In the sides of a metal channel there are cut right angular notches, the apex of each notch being disposed adjacent the edge of the web of the channel, and the web of the channel is then bent to bring the two parts at right angles to each other. This leaves the web of one channel integral with the web of the other, but it is evident that this is not essential to my invention, as the invention is equally applicable to securing together of two entirely separate and distinct pieces.

To facilitate the description of the invention, I will refer to the frame as being formed of two channels having abutting ends. In Fig. 2, I have illustrated two channels 10 and 11, each having its end cut at an angle of forty-five degrees, and the two channels placed with their ends abutting and ready to be soldered. Within the two channels at their abutting ends, I insert an inner channel member 12, having two sides 13 and 14 connected together by a web 15. The inner members may be of thin tin or any other suitable metal, and the channel is of a less width than the distance between the sides of the channels. The outer or free edges of the sides 13 and 14 normally diverge, so that they naturally tend to assume positions farther apart than the distance between the sides of the channel. With the two channels in the position indicated in Fig. 2, the inner channel member is picked up with a pair of tweezers, dipped in acid and inserted within the joint, as indicated in Figs. 3 and 5. The free edges will resiliently engage the inner surfaces of the sides of the channels, so as to hold said sides in alinement with each other, but at the inner portion of the inner member, that is, the portion adjacent the web 15, the sides of the inner member will be out of engagement with the sides of the channels. This will leave capillary spaces 16 and 17 partially filled with the acid adhering to the inner member. A drop of molten soft solder is then deposited within the inner member. The solder passes out at the ends of the inner member into the channels and immediately flows upwardly in the capillary spaces to completely fill said spaces and to effectively secure the entire outer surface of both sides of the inner member to the adjacent sides of the channels. The solder will also travel into the narrow crevice between the abutting ends of the sides of the channels, and fill this space flush with the outer surface of the channels. The solder is, of course, either heated to such an extent that it will flow properly before hardening, or the channels are heated to a limited extent prior to or at the time the solder is inserted. A joint formed in this manner of soft solder is far stronger than an ordinary joint formed with hard solder; the parts are not warped, distorted or discolored during the soldering, and a workman can solder a joint in far less time.

The inner member is of very thin metal and does not obstruct the inner portion of the frame to any appreciable extent, whereas in soldering the parts with hard solder and a soldering iron, drops of solder often harden within the container so as to nearly close the same. The inner channel member may be of any form or size desired. In Figs. 1 and 3, I have shown the inner channel member 12 substantially triangular in form, but it is evident that I might use an inner channel member 12$^a$ substantially rectangular in form as shown in Fig. 7. It is only essential that the inner channel member be of such shape and size that it overlap the abutting edges of the channels going to make up the form.

Having thus described my invention, I claim as new and desire to secure by Letters Patent:

1. The process of securing together the ends of metal channels, consisting in inserting within said channels at their abutting ends, a channel member having a web narrower than the distance between the sides of the metal channels and with its sides spaced from the sides of the metal channels to leave capillary spaces, and depositing molten solder within the inner channel member, the solder being free to flow out of the inner member and be drawn upwardly by capillary attraction into said capillary spaces.

2. A frame including two channels having abutting ends, an inner channel member overlapping said abutting ends and having its edges holding the sides of said channels in alinement, and solder intermediate the sides of the inner member and the sides of the channels.

3. A frame including two channels having abutting ends, an inner channel member overlapping said abutting ends and having its edges holding the sides of the channels in alinement and having its web narrower than the space between the sides of the channels to form capillary spaces between the sides of the inner channel member and the sides of said channels, and solder filling said capillary spaces.

In testimony whereof I have signed my name to this specification in the presence of two subscribing witnesses.

LOUIS B. PRAHAR.

Witnesses:
  CLAIR W. FAIRBANK,
  PHILIP D. ROLLHAUS.